Feb. 17, 1948.    D. L. MILLER    2,436,261
ENGINE STARTER DRIVE
Filed Oct. 29, 1945

WITNESS
Esther N. Stockton.

INVENTOR.
Donald L. Miller
BY
Clinton S. James
ATTORNEY

Patented Feb. 17, 1948

2,436,261

UNITED STATES PATENT OFFICE 2,436,261

ENGINE STARTER DRIVE

Donald L. Miller, Chemung County, N. Y., assignor to Bendix Aviation Corporation, South Bend, Ind., a corporation of Delaware Application October 29, 1945, Serial No. 625,302

3 Claims. (Cl. 74—7)

The present invention relates to an engine starter drive and more particularly to a heavy duty type of starter wherein the shaft for actuating the engine driving member is indirectly driven from a starting motor through a reduction gearing.

It is an object of the present invention to provide a novel starter of the above type which is strong and easily adjustable for heavy service requirements.

It is another object to provide such a device in which an overload release coupling is substantially housed within a drive gear of the starter for simplicity and direct application of driving force to the coupling.

It is another object to provide such a device having a compact arrangement of coupling and gearing members to reduce the overall dimensions and consequently the amount of stock required for producing the starting drive.

It is a further object to provide such a device having a solid mounting shaft for assuring the alignment of its parts and consequently improving the operation thereof.

It is a further object to provide such a device in which an adjusting member for the coupling also serves as a safety member to assist in holding the stop member in place.

Figure 1:
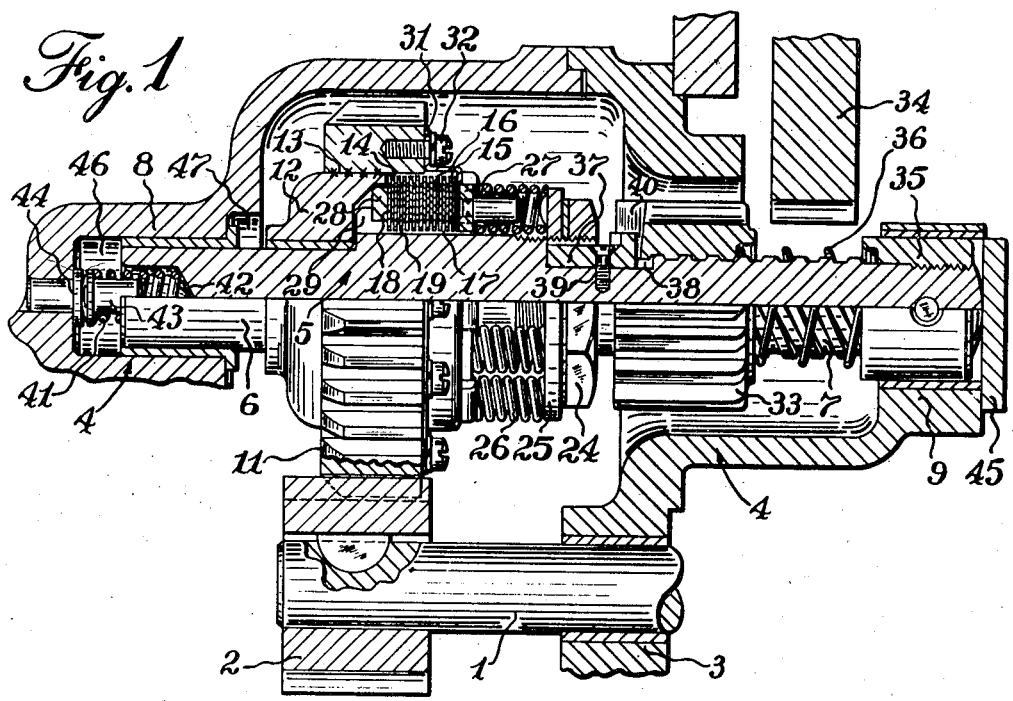
Figure 2:
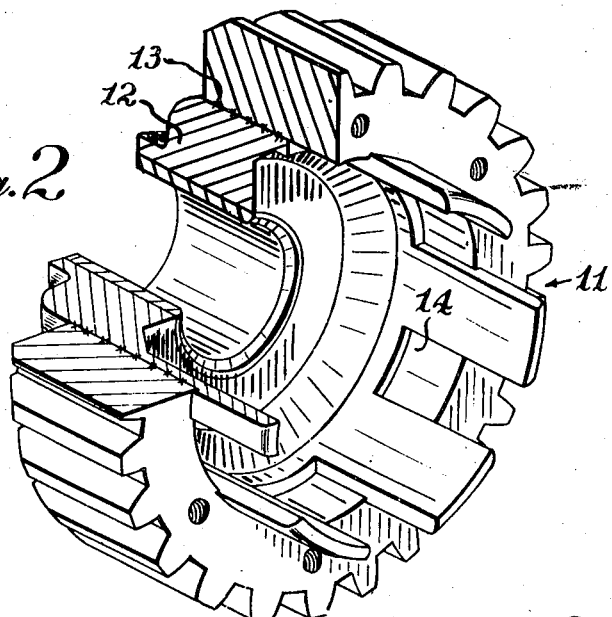

Further objects and advantages will be apparent to those skilled in the art by reference to the following description and the accompanying drawing, in which:

Fig. 1 is a side elevation partly in section of a preferred form of the present invention showing the starting drive in idle position; and Fig. 2 is an enlarged detail in perspective of the drive gear and coupling housing assembly partly broken away and in section.

In Fig. 1 of the drawing, a power shaft 1 having a pinion 2 fixedly mounted thereon is shown journalled in a bearing 3 of a casing 4, said shaft being connected to a suitable source of power such as an electric or internal combustion starting motor, not shown. Parallel to the power shaft 1 is arranged an operating or actuating member in the form of a shaft 5 having a smooth portion at 6 and a threaded portion at 7. Shaft 5 is slidably journalled at its ends for rotation and limited longitudinal motion in bearings 8 and 9 of the casing 4.

A transmission member in the form of a gear 11 having meshing engagement with the pinion 2 is rotatably mounted upon shaft 5 by means of a hub member 12 journaled on the smooth portion 6 of shaft 5 and fixedly attached to the gear by suitable means such as brazing as indicated at 13. Coupling means are provided for connecting the gear 11 to the shaft 5 for rotation in unison, while being adapted to slip so as to absorb excessive torsional drive stresses. For this purpose, the hub member 12 is provided with spline slots 14 for slidably receiving peripheral lugs 15 of driving coupling discs 16, while shaft 5 is formed with a splined portion 17, to which the alternately arranged driven coupling discs 18 are connected by means of their inwardly extending lugs 19.

Adjustable means for applying pressure to the pack of discs to control the transmission of torque therethrough are provided comprising a nut member 24 threaded on the shaft 5 and an adjacent abutment plate 25 against which are seated a plurality of springs 26 bearing at their other ends against a pressure plate 27. The pressure of the springs 26 is carried through the pack of coupling discs to a backing plate 28 which presses against the abutment lugs 29 projecting from shaft 5. A retainer ring 31 is suitably attached as by means of screws 32 to gear 11 in position to overhang the coupling discs on the forward side so as to retain the discs in assembled position even though the pressure plate is removed.

An engine driving member in the form of an internally threaded pinion 33 is mounted on the threaded portion 7 of shaft 5 so that rotation of the shaft traverses the pinion into mesh with an engine member such as a ring gear 34. A stop nut 35 suitably fixed on the end of shaft 5 serves to arrest travel of the pinion 33 so as to define its meshed position and also forms the bearing member for the shaft 5 within the journal 9. An antidrift spring 36 is arranged between stop nut 35 and pinion 33 to maintain the pinion in demeshed position while the starter drive is idle. Means for defining the idle position of the pinion is provided in the form of an abutment member 37 which is tightly held in a recess 38 in shaft 5 by a screw 39 and is so located angularly as to be struck by a radial abutment surface 40 formed on the pinion 33 so as to stop the rotation of the pinion when it is thrown back to idle position by the engine gear 34 when the engine starts.

The abutment 37 is so located adjacent the threads of the coupling adjusting nut 24 that said nut acts as a safety guard to prevent the abutment and its attachment screw 39 from dropping off if these members become loosened in service.

Means are provided for assisting in the meshing of the pinion 33 with the engine gear 34 if tooth abutment between these members should occur during the meshing operation. As shown, this means is in the form of a compression spring 41 seated in a recess 42 of the shaft 5 and pressing the thrust pin 43 against a thrust block 44 in the casing 4 to urge the shaft 5 in a forward direction against the abutment plate 45. Space is provided at 46 and 47 to permit the starting drive to move to the left and compress the spring 41 until sufficient torque is built up to index the pinion teeth into registry with the tooth spaces of the engine gear 34. The spring 41 then expands and initiates the meshing action which is completed in the usual manner.

In operation, rotation of the power shaft 1 causes rotation of the transmission gear 11 and consequently also the attached hub member 12 and coupling discs 16. Since the coupling discs 16 and 18 are always tightly pressed together by the springs 26, the coupling housing causes rotation of the operating shaft 5 through the coupling discs to traverse the engine driving pinion 33 into mesh with the engine gear 34. When the engine becomes self-operative, the engine gear 34 overruns the shaft 5, causing the pinion 33 to be thrown back out of mesh until its movement is arrested by the abutment 37 which prevents the gear from jamming on the screw shaft. Occasionally, the teeth of the pinion 33 will engage at their end surfaces against the teeth of the engine gear 34 and if this should occur the screw jack action of the pinion on its traversing threads at the moment of starting will cause the starting drive to move backward against the pressure of spring 41 and reduce the clearance spaces 46 and 47 between the housing 4 and the starting drive. The pressure of the spring 41 builds up increased friction between the threads of the pinion and screw shaft, and when this friction reaches a value sufficient to overcome the jamming pressure at the opposing tooth faces of the pinion and engine gear, the pinion will index and then advance into mesh with the engine gear as in the first case.

It will be seen that there is here provided a strong and sturdy engine starting drive of the heavy duty type in which the arrangement of its parts affords a minimum overall length and the driving forces therein are closely coupled by the telescoped arrangement of its parts.

It is understood that this embodiment of the invention is not exclusive and other embodiments are possible and changes may be made in the form and arrangement of its parts without departing from the spirit of the invention as defined in the following claims.

What is claimed is:

1. In an engine starter, a power shaft and a pinion fixed thereon, an operating shaft, a hub member journalled on said operating shaft, a gear fixed to said hub member and meshed with said pinion, an overload release coupling within said hub member connecting said hub member and operating shaft, an engine driving member threaded to said operating shaft for traversal into engagement with and rotation of a member of the engine to be started, bearings for the operating shaft permitting limited longitudinal movement thereof, and yielding means for urging the shaft toward the engine member.

2. In an engine starter, a power shaft and a pinion fixed thereon, an operating shaft, a hub member journalled on said operating shaft, a gear fixed to said hub member and meshed with said pinion, an overload release coupling within said hub member connecting said hub member and operating shaft, an engine driving member threaded to said operating shaft for traversal into engagement with and rotation of a member of the engine to be started, an adjusting member for said coupling fixed to said operating shaft, and an abutment member for said engine driving member attached to said operating shaft beneath said adjusting member and having means for preventing the removal of the adjusting member.

3. In an engine starter, a power-operated pinion and a transmission gear in driving engagement therewith, an operating shaft co-axial with said gear and an engine member mounted thereon for relative traversal upon relative rotation into operating engagement with a member of the engine to be started, an overload release coupling, a unitary member comprising a hub for said gear and a housing for said coupling, means for connecting said coupling with said unitary member and the operating shaft, an adjustment member for said coupling on said operating shaft adjacent the idle position of said engine driving member, and an abutment member fixed in said operating shaft substantially underneath said adjustment member.

DONALD L. MILLER.

REFERENCES CITED

The following references are of record in the file of this patent:

UNITED STATES PATENTS

| Number | Name | Date |
|---|---|---|
| 1,393,595 | Wolffsohn | Oct. 11, 1921 |
| 1,911,414 | Waseige | May 30, 1933 |